United States Patent
Zeltser

(10) Patent No.: US 9,774,627 B2
(45) Date of Patent: Sep. 26, 2017

(54) DETECTING MEMORY-SCRAPING MALWARE

(71) Applicant: Leonid Zeltser, Brooklyn, NY (US)

(72) Inventor: Leonid Zeltser, Brooklyn, NY (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/317,505

(22) Filed: Jun. 27, 2014

(65) Prior Publication Data

US 2015/0381655 A1    Dec. 31, 2015

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/55 | (2013.01) |
| G06F 21/57 | (2013.01) |

(52) U.S. Cl.
CPC ........ H04L 63/1491 (2013.01); G06F 21/554 (2013.01); G06F 21/57 (2013.01); H04L 63/1416 (2013.01)

(58) Field of Classification Search
CPC ............. H04L 63/1416; H04L 63/1441; H04L 63/145; H04L 63/1408; G06F 21/56

USPC .......................................................... 726/23
See application file for complete search history.

(56) References Cited

U.S. PATENT DOCUMENTS

| | | | | |
|---|---|---|---|---|
| 6,775,657 B1* | 8/2004 | Baker | ................. | H04L 63/1408 706/45 |
| 2008/0098476 A1* | 4/2008 | Syversen | ............ | H04L 63/0227 726/23 |
| 2010/0077483 A1* | 3/2010 | Stolfo | .................... | G06F 21/554 726/24 |
| 2012/0084866 A1* | 4/2012 | Stolfo | .................... | G06F 21/554 726/25 |
| 2012/0233222 A1* | 9/2012 | Roesch | ............... | H04L 63/1408 707/812 |

* cited by examiner

*Primary Examiner* — Kambiz Zand
*Assistant Examiner* — Stephen Sanders
(74) *Attorney, Agent, or Firm* — Schwegman, Lundberg & Woessner

(57) ABSTRACT

Honey tokens are generated by one or more applications in memory of a device. The honey tokens resemble data that may be of interest to memory-scraping malware. The honey tokens are monitored in memory and when access is detected an alert is raised that there is a potential of having memory-scraping malware, which is operational within memory of the device.

19 Claims, 4 Drawing Sheets

DETECTING MEMORY-SCRAPING MALWARE

BACKGROUND

Spyware and malware are problematic for consumers and organizations. Despite attempting to block malicious software (malware), individuals and businesses continue to get infected, suffering substantial financial losses due to data stolen from their systems. The problem is very sensitive to the public. In fact, a data breach that involves spyware or other types of malware can put an organization out of business when it leaks trade secrets or sensitive data whose disclosure can lead to fines or other penalties. Furthermore, recovering from a malware infection is very costly, and can involve the need to hire forensic investigators and to buy new computing devices.

Malicious software attempts to evade detection of antivirus software and other anti-malware software using a variety of means. As a result, it has become impractical to rely solely on anti-malware tools and other traditional security mechanisms to resist malware infections.

One way in which malicious software can steal sensitive data involves extracting such data from runtime memory of the compromised system or device. For example, such "memory scraping" techniques have been used to steal card data (debit, credit, gift, etc.) from infected Point-Of-Sale (POS) systems. Such malware scans memory for data that resembles the format of the data it is designed to steal, such as magnetic card data stored in memory by a POS application. Alternatively, the malware monitors the applications that produce or use the card data, attempting to intercept the data when the applications pass, write, or transmit it.

Thus, despite encrypting sensitive data during storage and transit, applications that need to process the data need to temporarily store it in memory in a decrypted form. This brief window of time presents malware with an opportunity to capture the data. Such memory scraping techniques were used in numerous POS breaches with the help of malicious tools such as Dexter, ChewBacca, and BlackPOS to the detriment of the affected organizations and their customers.

These breaches have occurred even though many of the affected organizations deployed traditional security mechanisms, such as antivirus software and firewalls. It may be impractical or costly to prevent the act of memory scraping without re-architecting the affected applications and the ecosystem within which they operate. However, if the organization could detect the presence of such malware early, the organization may shorten its incident response time and minimize losses.

Memory-scraping malware repeatedly enumerates local processes to locate the targeted application. It then reads the application's runtime memory to locate a pattern that matches the desired data. Some malicious programs only look at memory of processes that possesses the desired characteristics, while others are less discriminate, examining memory of all running processes. More sophisticated memory-scraping malware avoids reading the memory on its own; instead, it stealthily modifies ("hooks") the targeted application, so the malware can observe the legitimate application accessing or otherwise processing the sensitive data.

Therefore, there is a need for improved detection of memory-scraping malware.

SUMMARY

In various embodiments, techniques for detecting memory-scraping malware are presented. According to an embodiment, a method for detecting memory-scraping malware is provided.

Specifically, a token that mimics a format of data produced by an application is produced in a memory and any subsequent access made to the token within the memory is monitored. In an embodiment, attempts by a protected system to store or transmit a token are also monitored.

DETAILED DESCRIPTION

Figure 1:
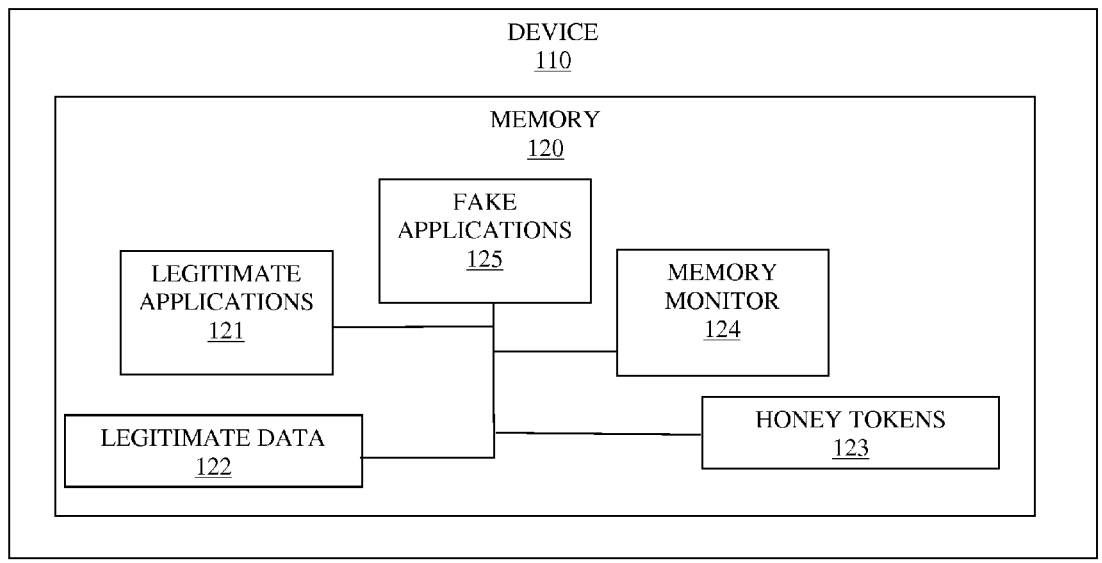
FIG. 1 is a diagram of a device for practicing the detection of memory-scraping malware within that device, according to an example embodiment.

FIG. 1 is a diagram of a device 110 for practicing the detection of memory-scraping malware within that device, according to an example embodiment. The components of the device 110 are shown in greatly simplified form with only those components shown necessary for the understanding of the various embodiments of the invention.

The device 110 includes memory 120. The memory 120 includes legitimate applications 121, legitimate data 122, honey tokens 123, a memory monitor 124, and, optionally, fake applications 125.

The device 110 can be any processing device having memory, such as but not limited to: a Point-Of-Sale (POS) device, a kiosk, an Automated Teller Machine (ATM), a laptop, a desktop computer, a server, a phone, a tablet, a wearable processing device, and the like.

The legitimate applications 121 are real applications that are authorized to process in the memory 120 and known to be processing in the memory 120.

The legitimate data 122 is sensitive data that the legitimate applications 121 produce and/or consume (process in some manner). The legitimate data 122 is in decrypted format although may have been in an encrypted format before decryption by the legitimate applications 121 for processing.

The honey tokens 123 is fake sensitive data that mimics the format and perhaps content (although fake content) that legitimate data might have. For example, consider that the legitimate data 122 is a set of Social Security Numbers (SSNs) in a format of NNN-NN-NNNN (9 digits of numbers 0-9). A honey token 123 may appear as 111-11-1111, or known SSNs that are not real. The same is true for legitimate card data obtained from reading cards, such as credit cards, debit cards, gift cards, and the like. That is, the honey tokens 123 for legitimate data 122 associated with payment card data would be in a same format as the legitimate data 122 but not include any real account or customer information.

The legitimate data 122 is the object of any memory-scraping malware (not shown in the FIG. 1) that may be present in memory 120. That is, the memory-scraping malware monitors for data resembling the legitimate data 122 or monitors the legitimate applications 121 for production of the legitimate data.

The memory monitor 124 monitors access to any of the honey tokens 123. The legitimate applications 121 will not be configured to access the honey tokens 123. So, the memory monitor can assume that when a honey token 123 is accessed that there is potential for memory malware being present in the memory 120 of the device 110.

A variety of techniques can be used by the memory monitor 124 to monitor access to the honey tokens 123. The implementation of such technique is dependent on the technical architecture and capabilities of the device being protected. For example, operating system (OS) events can be registered for or by the memory monitor 124 to provide notification on access and provide other valuable information, such as process identifier of the accessing application. The process identifier may be useful to the memory monitor 124 to detect where the memory malware is copying or moving the honey token 123, such as to a file in memory, or to a network stack that is to be sent to a specific Internet Protocol (IP) address over the network. This information can be logged by the memory monitor 124 and/or reported in real time to other processes or individuals via messages.

It is also noted that "monitor" includes the monitoring of passive and active activities, such as reading, writing, and/or transmitting data.

In another case, each honey token 123 has a recognizable signature such that when access to such a token 123 is detected by the memory monitor 124, the memory monitor 124 can scan memory 120 for its signature to see where it is in memory 120 and what a possible identity is for a process that is using it. The memory monitor 124 may also monitor the network stack of the device 110 to detect when data that matches the signature is transmitted out of the device 110. The memory monitor 124 can also monitor storage of the device 110 to detect when data that matches the signature is saved to disk or non-transitory computer-readable storage media. These events can be treated as indicators that a honey token 123 was accessed and, therefore, that the device 110 might be infected.

The embodiments presented herein propose use of a deception-based approach to detect memory malware. This involves placing in the system's memory fake data ("honey token" 123) that is formatted to resemble data (legitimate data 122) pursued by potential memory-scraping malware. A memory monitor 124 (active and passive as discussed above) on the device 110 triggers whenever the honey token 123 is accessed. Since this honey token 123 isn't used by a legitimate application 121, any attempt to read, write, or transmit it suggests presence of memory-scraping malware.

The fake application 125 mimics the legitimate applications 121 so as to appear to be the legitimate applications 125. The fake application 125 is configured to produce the honey tokens 123. It is noted that the fake application 125 is optional as the legitimate applications 121 can be enhanced to produce the honey tokens 123 without any assistance from the fake application 125.

Also, the memory monitor 124 may be part of or associated with the legitimate applications 121 (not shown in the FIG. 1). So, it is noted that both the production of the honey tokens 123 and the monitoring of access occurring with the honey tokens 123 can be achieved through enhancements to the legitimate applications 121.

The techniques herein propose an approach to detecting memory-scraping malware using deception-based tactics, rather than attempting to block the malicious software or relying on traditional anti-malware approaches to spot its presence. The techniques involve storing in memory 120 of the protected device 110 fake data ("honey token" 123) that is formatted to resemble the data (legitimate data 122) that malware might want to obtain. For example, when this approach is used to safeguard POS systems, it generates a honey token 123 that resembles Track 1 or Track 2 contents of a magnetic card.

In an embodiment, the honey token 123 is stored in memory 110 of a fake application 125, which will be designed to mimic key traits of the legitimate application 121 that a memory scraper might target. For instance, the fake application 125 can use a process name that matches that of a real application 121, use the same mutex values (when practical), etc. The techniques may use a toolkit that generates such fake applications 125 according to the desired parameters and also configures the applications 125 to generate honey tokens 123 that follow the desired format.

As stated above, and in an embodiment, the techniques may also incorporate a scenario where a legitimate application 121 that might be targeted generates a honey token 123, storing it in memory 120 separately from the actual sensitive data 122 that it processes.

A monitoring application (may also be referred to as a software "sensor") 124 runs on the device 110, attaching to the protected applications 121 without interrupting their execution. Alternatively, the sensor 124 may run as a separate thread inside the monitored applications 121 (not shown in the FIG. 1). The sensor 124 locates the honey token 123 and may set (as one example) a memory-on-access breakpoint on it (the way a debugger might have done it). This means that sensor 124 is notified whenever the memory location where the token 123 resides is accessed. The breakpoint can be set using various techniques similar to those implemented by traditional debuggers. For instance, on Windows® the PAGE_GUARD modifier of memory pages corresponding to the token 123 could be set; this way, when the memory pages are accessed, the device 110 generates a STATUS_GUARD_PAGE_VIOLATION exception that is intercepted by the sensor 124.

Since contents of the honey token 123 aren't meant to be accessed by a legitimate application 121, any attempt to read it suggests the presence of malicious software. This generates an alert, prompting the organization to investigate the potentially-affected device 110 for other indicators of a compromise.

The techniques herein act as a lightweight addition to the existing security defenses that organizations or individuals can deploy to protect themselves against data breaches. It is suitable for situations where the traditional defenses alone aren't sufficient, which include numerous real-world data breaches. Using honey tokens 123 in the way described herein, offers an enhanced way to detect memory-scraping malware with a relatively low rate of false alarms.

Figure 2:
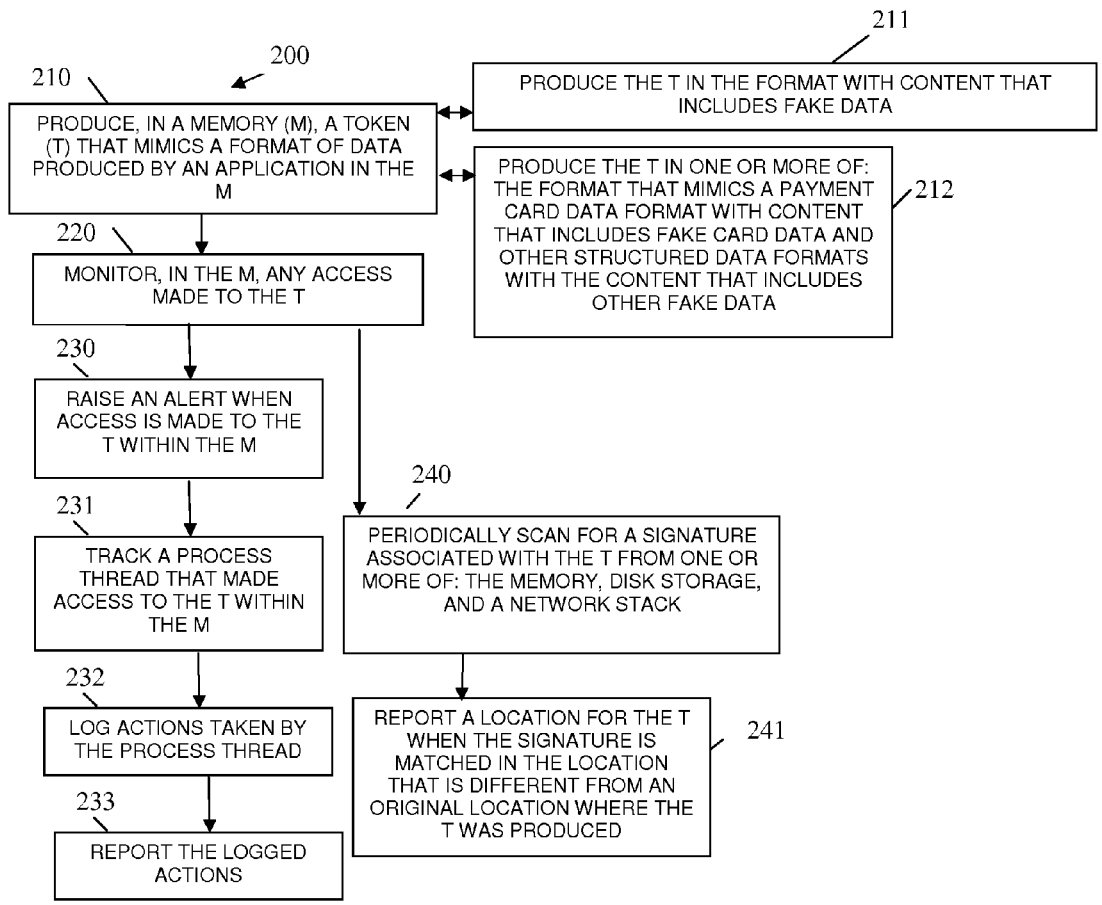
FIG. 2 is a diagram of a method for detecting memory-scraping malware, according to an example embodiment.
Figure 3:
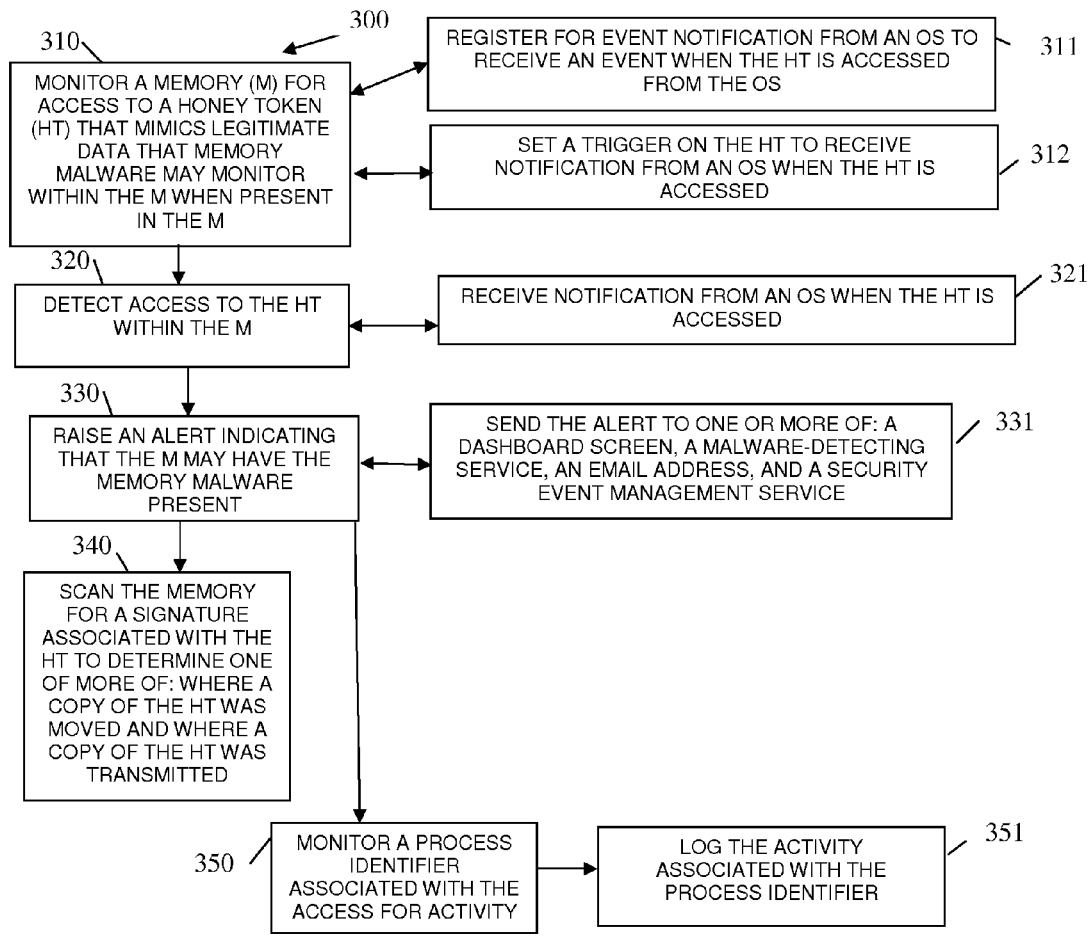
FIG. 3 is a diagram of another method for detecting memory-scraping malware, according to an example embodiment.
Figure 4:
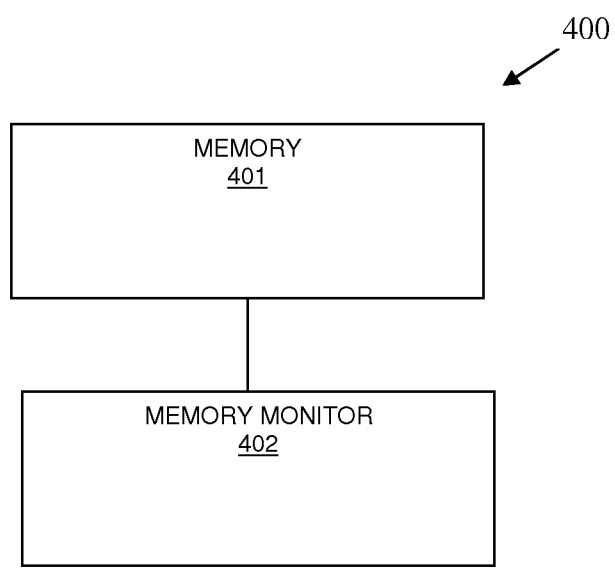
FIG. 4 is a diagram of a memory-scraping malware detection system, according to an example embodiment.

The above-discussed embodiments and other embodiments are now presented with the discussions of the FIGS. 2-4.

FIG. 2 is a diagram of a method 200 for detecting memory-scraping malware, according to an example embodiment. The method 200 (hereinafter "memory monitor") is implemented as one or more software modules represented as executable instructions programmed and residing in memory or on a non-transitory computer-readable (processor-readable) storage medium and executed by one or more processors of a device. The processors are specifically configured and programmed to process the memory monitor. The memory monitor may also operate over one or more networks. The networks are wired, wireless, or a combination of wired and wireless.

In an embodiment, the memory monitor is the memory monitor 124 of the FIG. 1.

In an embodiment, the memory monitor is a combination of the fake application 125 and the memory monitor 124 of the FIG. 1.

In an embodiment the memory monitor is a legitimate application 121 enhanced to produce honey tokens 123 and monitor access to the honey tokens 123 such as memory monitor 124 does in the FIG. 1.

At 210, the memory monitor produces a token that mimics a format of data produced by an application in the memory. The data is legitimate data that a legitimate application produces. The use of "legitimate" is intended to mean authorized, authenticated, or expected. So, the memory monitor produces fake data that is mimics a format of the legitimate data.

According to an embodiment, at 211, the memory monitor produces the token in the format with content that includes fake data. In other words, the format is the same as the legitimate data but the content of the token is not the same as what would be produced by a legitimate application; rather, the content of the token is faked to induce any malware present in the memory to access the token.

In an embodiment, at 212, the memory monitor produces the token in the format that mimics a magnetic card data format with content that includes fake card data. This is particularly useful in devices that process card data to detect when malware is present in the memory of such devices. This may be a case where the memory monitor is part of the legitimate applications 121 or fake applications 125 of the FIG. 1. That is, the memory monitor can perform multiple actions as was described in the FIG. 1. The memory monitor may also produce the token in any other structured data formats with the content including other fake data.

At 220, the memory monitor monitors, in the memory, any access made to the token. This is designed to capture a potential malware application executing in the memory.

In an embodiment, at 230, the memory monitor raises an alert when access is made within the memory.

In an embodiment of 230 and at 231, the memory monitor tracks a process thread that made access to the token within the memory.

In an embodiment of 231 and at 232, the memory monitor logs actions taken by the process thread from within the memory.

In an embodiment of 232 and at 233, the memory monitor reports the logged actions.

According to an embodiment, at 240, the memory monitor periodically scans for a signature associated with the token from the memory, disk storage, and/or a network stack.

In an embodiment of 240 and at 241, the memory monitor reports a location for the token when the signature is matched in the location that is different from an original location where the token was produced within the memory.

FIG. 3 is a diagram of another method 300 for detecting memory-scraping malware, according to an example embodiment. The method 300 (hereinafter "honey token manager") is implemented as one or more software modules represented as executable instructions and programmed within memory or a non-transitory computer-readable (processor-readable) storage medium that executes on one or more processors of a device; the processors of the device are specifically configured to execute the honey token manager. The honey token manager may also be operational over one or more networks; the networks may be wired, wireless, or a combination of wired and wireless.

The honey token manager presents another and in some ways enhanced view of the memory monitor presented above with reference to the method 200 of the FIG. 2.

In an embodiment, the honey token manager is the memory monitor 124 of the FIG. 1.

In an embodiment, the honey token manager is a combination of the fake application 125 and the memory monitor 124 of the FIG. 1.

In an embodiment the honey token manager is a legitimate application 121 enhanced to produce honey tokens 123 and monitor access to the honey tokens 123 such as memory monitor 124 does in the FIG. 1.

In an embodiment, the honey token manager is the memory monitor described above with reference to the method 200 of the FIG. 2.

At 310, the honey token manager monitors a memory for access to a honey token that mimics legitimate data that memory malware may monitor within the memory when the honey token is present in the memory.

In an embodiment, at 311, the honey token manager registers for event notification from an Operating System (OS) to receive an event when the honey token is accessed from the OS.

In an embodiment, at 312, the honey token manager sets a trigger on the honey token to receive notification from an OS when the honey token is accessed.

At 320, the honey token manager detects access to the honey token within the memory.

According to an embodiment, at 321, the honey token manager receives notification from an OS when the honey token is accessed.

At 330, the honey token manager raises an alert indicating that the memory may have the memory malware present within the memory.

In an embodiment, at 331, the honey token manager sends the alert to: a dashboard screen, a malware-detecting service, an email address, a security event management service, and the like.

According to an embodiment, at 340, the honey token manager scans the memory for a signature associated with the honey token to determine where a copy of the honey token was moved or may have been moved and/or where a copy of the honey token was transmitted.

In an embodiment, at 350, the honey token manager monitors a processing identifier associated with the access for activity of the process associated with the process identifier.

In an embodiment of 350 and at 351, the honey token manager logs the activity associated with the processing identifier. The honey token manager may also report the log or report the activity in real time as it is detected and tracked.

FIG. 4 is a diagram of a memory malware detection system 400, according to an example embodiment. The components of the memory malware detection system 400 are implemented as executable instructions and programmed within memory and/or a non-transitory computer-readable (processor-readable) storage medium that execute on one or more processors of a device; the processors are specifically configured to execute the components of the memory malware detection system 400. The memory malware detection system 400 may also be operational over one or more networks; any such networks may be wired, wireless, or a combination of wired and wireless.

The memory malware detection system 400 includes memory 401 and a memory monitor 402.

The memory monitor 402 is implemented as a set of executable instructions programmed in the memory 401 and executed by a processor of a device associated with the memory 401.

In an embodiment, the device that executes the memory monitor 402 is a kiosk.

In an embodiment, the device that executes the memory monitor 402 is a POS device.

In an embodiment, the device that executes the memory monitor 402 is an ATM.

In an embodiment, the device that executes the memory monitor 402 is a desktop computer.

In an embodiment, the device that executes the memory monitor 402 is a laptop computer.

In an embodiment, the device that executes the memory monitor 402 is a server.

In an embodiment, the device that executes the memory monitor 402 is a tablet computing device.

In an embodiment, the device that executes the memory monitor 402 is a wearable processing device.

In an embodiment, the memory monitor 402 is one or more of the components 121, 124, and 125 of the FIG. 1.

In an embodiment, the memory monitor 402 is the method 200 of the FIG. 2.

In an embodiment, the memory monitor 402 is the method 300 of the FIG. 3.

The memory monitor 402 is configured and adapted to: execute within the memory 120; detect access to a honey token within the memory, where the honey token is fake data that resembles legitimate data of interest to memory malware, and report on any access made to the honey token within the memory 401.

According to an embodiment, the memory monitor 402 is further adapted and configured to suspend or cause to suspend processing of all applications executing within the memory 401 on detection of access to the honey token.

In an embodiment, the memory monitor is further adapted and configured to track a process identifier associated with the access attempt and log activity of that process identifier.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
producing, in a memory, a token that mimics a format of data produced by an application in the memory, wherein producing further includes preventing a legitimate application known to be processing in memory from accessing the token; and
monitoring, in the memory, any access made to the token, and wherein monitoring further includes detecting when data associated with the token is transferred out of a device through a network stack of the device, detecting when the data associated with the token is saved to a non-transitory computer-readable storage media, and detecting when the data associated with the token is in the memory, and wherein detecting further includes detecting that the data associated with the token is within the memory, the network stack, or the non-transitory computer-readable storage media by scanning the memory, the network stack and the non-transitory computer-readable storage media and identifying a signature of the token.

2. The method of claim 1 further comprising, raising an alert when access is made to the token within the memory.

3. The method of claim 2 further comprising, tracking a process thread that made access to the token within the memory.

4. The method of claim 3 further comprising, logging actions taken by the process thread.

5. The method of claim 4 further comprising, reporting the logged actions.

6. The method of claim 1 further comprising, reporting a location for the token when the signature is matched in the location that is different from an original location where the token was produced.

7. The method of claim 1, wherein producing further includes producing the token in the format with content that includes fake data.

8. The method of claim 1, wherein producing further includes producing the token in one or more of: the format that mimics a payment card data format with content that includes fake card data and other structured data formats with the content that includes other fake data.

9. A method, comprising:
monitoring a memory, a network stack, and a non-transitory computer-readable storage medium for access to a honey token that mimics legitimate data that memory-scraping malware may monitor within the memory when present in the memory, wherein monitoring further includes preventing a legitimate application known to be processing in memory from accessing the legitimate application the honey token, and wherein monitoring further includes monitoring the network stack of a device for data associated with the honey token that is attempting to be sent from the device over a network, detecting when the data associated with the honey token is saved to a non-transitory computer-readable storage media, and detecting when the data associated with the honey token is in the memory, and wherein detecting further includes detecting that the data associated with the honey token is within the memory, the network stack, or the non-transitory computer-readable storage media by scanning the memory, the network stack and the non-transitory computer-readable storage media and identifying a signature of the honey token;
detecting access to the honey token within the memory based on the signature; and
raising an alert indicating that the memory may have the memory malware present based on detection of the signature within the memory, the network stack, or the non-transitory computer-readable storage media.

10. The method of claim 9 further comprising, scanning the memory for the signature associated with the honey token to determine one of more of: where a copy of the honey token was moved and where a copy of the honey token was transmitted.

11. The method of claim 9 further comprising, monitoring a process identifier associated with the access for activity.

12. The method of claim 11 further comprising, logging the activity associated with the process identifier.

13. The method of claim 9, wherein monitoring further includes registering for event notification from an Operating System (OS) to receive an event when the honey token is accessed from the OS.

14. The method of claim 9, wherein monitoring further includes setting a trigger on the honey token to receive notification from an Operating System (OS) when the honey token is accessed.

15. The method of claim 9, wherein detecting further includes receiving notification from an Operating System (OS) when the honey token is accessed.

16. The method of claim 9, wherein raising further includes sending the alert to one or more of: a dashboard screen, a malware-detecting service, an email address, and a security event management service.

17. A system comprising:
a memory; and
a memory monitor configured to: i) detect access to a honey token within the memory, a network stack, and a non-transitory computer-readable storage medium, wherein the honey token resembles legitimate data of interest to memory malware, ii) report any access attempt made on the honey token within the memory, the network stack, or the non-transitory computer-readable storage media when a scan of the memory, the network stack, or the non-transitory computer-readable storage media identifies a signature of the honey token, iii) monitor when data associated with the honey token is attempted to be sent from a device through the network stack of the device; and iv) prevent a legitimate application known to be processing in memory from accessing the honey token.

18. The system of claim 17, wherein the memory monitor is further configured to v) suspend or cause to suspend processing of all applications executing within the memory on detection of access to the honey token.

19. The system of claim 17, wherein the memory monitor is further configured to track a process identifier associated with the access attempt and log activity of that process identifier.

* * * * *